United States Patent [19]
Essick et al.

[11] Patent Number: 5,302,078
[45] Date of Patent: Apr. 12, 1994

[54] AUDIOCASSETTE AUTOMATIC UNLOADING MACHINE

[75] Inventors: Gale W. Essick, E. Canton; David J. Dillon, Canton, both of Ohio

[73] Assignee: Alpha Enterprises, Inc., North Canton, Ohio

[21] Appl. No.: 831,511

[22] Filed: Feb. 5, 1992

[51] Int. Cl.$^5$ .............................................. B65G 65/00
[52] U.S. Cl. ...................................... 414/786; 414/411; 414/403; 414/417; 414/797.9; 206/1.5; 29/252
[58] Field of Search ................. 414/797.9, 403, 404, 414/411, 417, 786; 206/387, 807, 45.14, 1.5; 70/63; 29/426.1, 721, 426.3, 791, 426.4, 809, 244, 250, 252

[56] References Cited
U.S. PATENT DOCUMENTS

| | | | |
|---|---|---|---|
| 3,828,195 | 8/1974 | Snarr | 414/411 |
| 3,891,854 | 6/1975 | Hura | 414/411 |
| 3,933,240 | 1/1976 | Humble | 206/1.5 |
| 4,239,189 | 12/1980 | Scherff | 414/797.9 X |
| 4,293,266 | 10/1981 | St. Lawrence et al. | 414/411 |
| 4,430,039 | 2/1984 | Boucherie | 414/417 |
| 4,481,618 | 11/1984 | Nakayama | 414/417 X |
| 4,834,238 | 5/1989 | Hehn et al. | 206/387 |
| 4,865,190 | 9/1989 | Gregerson et al. | 206/309 |

FOREIGN PATENT DOCUMENTS

2451318 11/1980 France ..................... 414/417

Primary Examiner—Frank E. Werner
Attorney, Agent, or Firm—Michael Sand Co.

[57] ABSTRACT

A machine and method for automatically unloading a cassette from a loaded security package of the type having a storage compartment and an access opening providing access into the compartment, and further having a lock plate movable over the access opening and into a locked position to block removal of the cassette from the security package. The security package is fed into an unload station by a pressure-actuated slide plate. Thereafter, a pressure-actuated unlock cylinder will automatically insert a plurality of pins into engagement with locking projections on the security package to disengage the lock plate from the locking projections. A pressure-actuated cylinder then will move the lock plate away from the access opening allowing free access to the storage compartment within the security package. A pressure-actuated pusher pad mounted vertically above the load package, will force one end of the cassette through the access opening, permitting the remainder of the cassette to fall through the access opening and into a collection hopper or conveyor. The empty security package then is discharged from the unload station as the next loaded security package is moved into position for unloading at the unload station.

6 Claims, 7 Drawing Sheets

AUDIOCASSETTE AUTOMATIC UNLOADING MACHINE

BACKGROUND OF THE INVENTION

1. Technical Field

The invention relates to a machine and related method for automatically unloading a cassette from a security package. More particularly, the invention relates to a machine and method which brings an audiocassette locked within a security package to a work station whereat a locking slide plate is automatically unlocked and removed from a storage compartment of the security package and the cassette is subsequently automatically unloaded from the storage compartment of the security package to enable the package to be reused.

2. Background Information

In recent years, audiocassettes have becomes increasingly popular and outsell the heretofore LP record discs and 8 track audio tapes. The introduction of these cassettes into the audio market presented a problem to the retail sellers in that the cassettes, which are smaller than the heretofore used 8 track tapes and record discs, had to be displayed so that perspective purchasers could inspect the tapes to determine the artist, songs, etc. on the cassettes. This presented a security problem due to the extremely small size of the audiocassettes and the corresponding ease of shoplifting.

Therefore, to reduce this shoplifting problem, the cassettes were placed in larger security packages of the type shown in U.S. Pat. No. 4,384,238, and 4,865,190. Although these security packages perform satisfactorily, they require that the cassette be locked into the storage compartment of the security package. When the patron purchases the cassette, the security package is removed via a key employed to unlock the security package thereby releasing the cassette. However, often cassettes are placed within the security package that do not sell and the retailer wishes to return them to the wholesaler. Heretofore, the only option for removing the unsold cassette from the security package was by manually unlocking each security package by work personnel which substantially increased the cost of the final distributed products, especially since these audio tapes are packaged and returned and subsequently separated from the security packages into millions.

The alternative to separating the security packages from the cassette is to discard the entire unit which presents not only an increase in final product distribution costs, but also creates unnecessary waste of which todays environmentally conscious society is so aware.

There is no known machine or method for automatically unloading cassettes from the storage compartment within a security package of which we are aware which will move the security package with a retained cassette to an unloading station whereat the security package is automatically unlocked and the cassette unloaded from the storage compartment of the security package with the cassette and empty security package placed in hoppers for subsequent reuse.

SUMMARY OF THE INVENTION

Objectives of the invention include providing an improved machine and associated method for automatically moving the locking mechanism of a security package from a locked to an unlocked position and for unloading a cassette, and in particular an audiocassette, from the security package.

A still further objective of the present invention is to provide such a machine which has a supply magazine containing a plurality of security packages with retained cassettes, which are moved by automatic transfer mechanisms to an unload station whereat a locked plate which is slidably mounted on the security package, is moved from a fully locked position to an unlocked position, afterwhich the contained cassette is automatically removed from the storage compartment of the security package with a minimum amount of moving parts and power operated components.

Another objective of the present invention is to provide such an unloading machine and method in which the security package with a retained cassette is moved to the unload station by a power actuated slide mechanism.

A still further objective is to provide such a machine which has a relatively simple construction, which achieves the stated objectives in a simple, effective, and inexpensive manner and which solves problems and satisfies needs in the art.

These and other objectives and advantages of the invention are obtained by the unloading machine of the present invention for automatically unloading a cassette from a security package of the type having a storage compartment and an access opening providing access into the storage compartment and further having a locking plate movable over the access opening and into a locked position to block removal of the cassette from the storage compartment, the general nature of which machine may be stated as including an unload station; feeder means for moving a loaded security package from a supply of said loaded packages to the unload station; unlocking means for moving the lock plate from the locked position to an unlocked position exposing said access opening; and unloading means for initially forcing a first end of the cassette in an angular direction through the access opening of the package and partially out of the storage compartment, and then subsequently allowing a second end of the cassette to fall from the storage compartment to fully remove the cassette therefrom.

These objectives and advantages are further obtained by the improved method of the present invention, the general nature of which may be stated as including a method for unloading a cassette from a security package of the type having a storage compartment, and lock means for locking a plate in a locked position to block removal of the cassette from within the storage compartment through an access opening; said method including the steps of moving a loaded security package from a supply of said loaded packages toward an unload station; disengaging the lock plate from the locking means within the security package; moving the lock plate from a locked position to an unlocked position; moving a first end of the cassette downwardly through the access opening of said storage compartment and partially out of said storage compartment; and allowing a second end of said cassette to fall out of said storage compartment to fully remove said cassette from said compartment.

BRIEF DESCRIPTION OF THE DRAWINGS

A preferred embodiment of the invention, illustrative of the best mode in which Applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
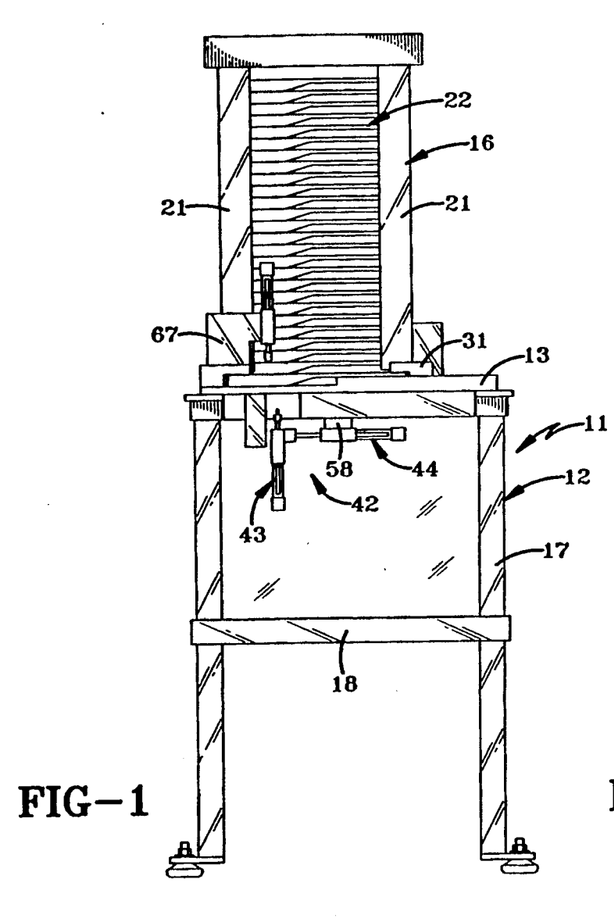
FIG. 1 is a generally diagrammatic elevational front view of the automatic unloading machine of the present invention.
Figure 2:
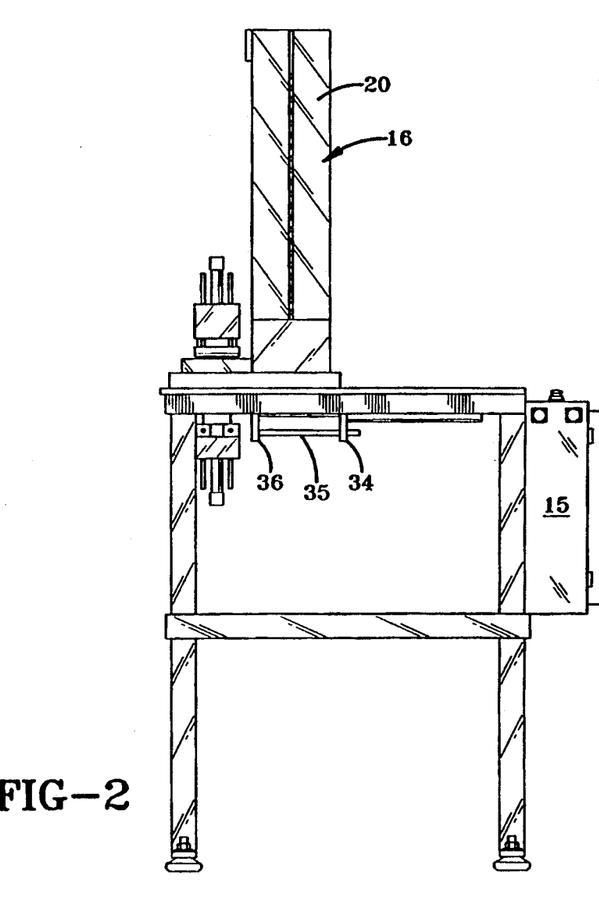
FIG. 2 is a generally diagrammatic side elevational view of the machine as shown in FIG. 1.
Figures 3, 9:
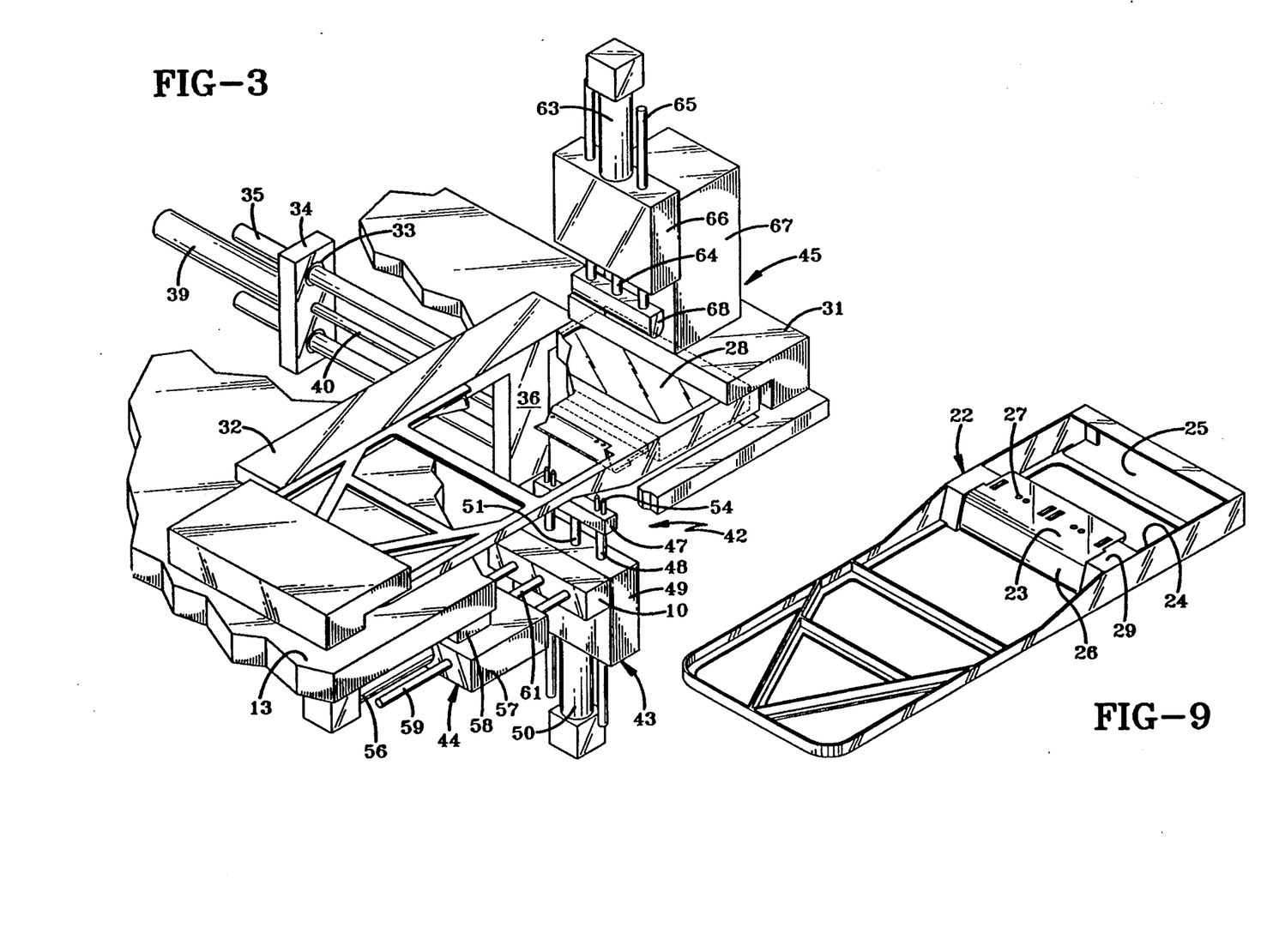
FIG. 3 is an enlarged diagrammatic perspective view with portions broken away, of the unload station showing a loaded security package immediately after entering the unload station.
FIG. 9 is a perspective view of one type of security package to be unloaded by the unloading machine of the present invention.

The unloading machine of the present invention is indicated generally at 11, and is shown particularly in FIGS. 1 and 2. Machine 11 includes a usual support stand 12 having an upper horizontal base 13 supported thereby, a vertically extending supply magazine, indicated generally at 16, and a control panel 15. Stand 12 includes a plurality of vertically and horizontally extending channels 17 and 18, respectively. Magazine 16 includes a pair of spaced vertically extending side panels 20 and front panels 21 for holding a plurality of cassette loaded security packages 22 therebetween, in a vertically stacked condition. Security packages 22 are usually one-piece molded plastic members such as shown in FIG. 9 and fully described in U.S. Pat. No. 4,834,238, the subject matter of which is incorporated herein by reference.

Specifically, each of the security packages 22 of the type to be unloaded by machine 11, has a lock plate 23 adapted to cover an access opening 24 formed in package 22, to allow access to an interior cassette holding compartment 25 of the security package. The lock plate is connected to the body of the security package by an integrally molded double living hinge 26 (FIG. 9). A plurality of key apertures 27 are formed in lock plate 23 in alignment with a plurality of locking projections (not shown) located within a lock housing portion 29 of package 22. The particular security package 22 described herein and shown in the drawings, is of the type shown in U.S. Pat. No. 4,834,238 and is adapted for use with a usual plastic storage case which contains an audio tape, the construction of which is well known in the art, and is referred to throughout as cassette 28.

Magazine 16 preferably retains a supply of security packages 22 with retained cassettes 19 therein in a vertical stacked position as shown particularly in FIG. 2. However magazine 16 may be slightly inclined such as to the right in FIG. 2 (not shown), to eliminate the need for front retaining panels 21 for retaining the supply of cassette loaded security packages 22 in the magazine.

In accordance with one of the features of the present invention, a slide assembly indicated generally at 30, is formed on base 13 adjacent to and below magazine 16, as shown particularly in FIGS. 3-8. Package slide assembly 30 includes a pair of spaced parallel L-shaped slide channels 31 having a spacing therebetween generally equal to the length of security package 22. Assembly 30 is positioned vertically below package supply magazine 16, so as to receive by gravity, a security package 22 having a cassette 28 locked therein, referred to hereinafter as a loaded security package.

A slide or pusher plate 32 is mounted on base 13 for horizontal sliding movement between slide channels 31 by a pair of slide rods 35. Rods 35 are slidably mounted by bearing sleeves 33 in a fixed support plate 34, which is mounted on and extends beneath base 13 (FIG. 2). Rods 35 extend horizontally beneath base 13 and terminate at an attachment plate 36 which connects to pusher plate 32 for extending under an unload station, indicated generally at 38. A pressure actuated fluid cylinder 39, preferably pneumatic, is mounted in a fixed position on support plate 34, and upon actuation will move slide plate 32 along base 13 by its connector to piston rod 40 of cylinder 39. Movement of plate 32 will engage a loaded security package 22 located behind slide channels 31 and beneath magazine 16, and will move it into work station 38, as shown particularly in FIGS. 7 and 8.

In further accordance with the present invention, an unload mechanism indicated generally at 42 is mounted at work station 38, and includes an unlocking assembly, an unlatching assembly and a cassette knockout assembly, indicated generally at 43, 44 and 45, respectively. Unlocking assembly 43 includes a key plate 47 mounted on the extended ends of a pair of slide rods 48 which are slidably mounted in a slide block 49. A pressure actuated cylinder 50 is attached to slide block 49 and its piston rod 51 is attached to key plate 47 for movement thereof towards and away from cassette lock plate 23. A plurality of pins 54 are mounted on and extend upwardly from key plate 47 for insertion through key apertures 27 of lock plate 23 and into engagement with locking projections located within lock housing portion 29. Unlock cylinder 50 is interposed between slide rods 48 with each slide rod extending into an aperture in the bottom surface of key plate 47, with piston rod 51 being attached at the center thereof to prevent torsional force from acting upon key plate 47.

Unlatching assembly 44 is oriented in a substantially orthogonal relation to security package unlocking assembly 43 and includes a linearly pressure actuated, unlatching cylinder 56 which is mounted on a support block 57. Block 57 is attached to the underside of base 13 by a bracket 58. A pair of slide rods 59 is slidably supported in a pair of complementary shaped apertures in bearing block 57 and are attached at one end to a block 60, which is fixedly attached to a side of bearing block 49 of unlocking assembly 43. Slide rods 59 and a piston rod 61 of cylinder 56, extend through bearing block 57 which supports the remaining components of unlatching assembly 44 and the components of unlocking assembly 43 beneath base 13.

Knockout assembly 45 is positioned above the path of a loaded security package 22, and particularly above the package when it comes to rest within unload mechanism 42. Knockout assembly 45 includes a linear pressure actuated unload cylinder 63 with associated piston rod 64. Cylinder 63 is interposed between two slide rods 65 which are slidably supported in a bearing block 66 which is attached to a mounting block 67. Block 67 is mounted on and extends upwardly from one of the L-shaped slide channels 31. One end of each rod 65 and piston rod 64 is attached to a pusher pad 68.

The operation of unload mechanism 42 is best understood by reference to FIGS. 3-8. A locked and loaded security package 22 is automatically placed by gravity from supply magazine 16, behind slide channels 31 on base 13, when pusher plate 32 is in a retracted position as shown particularly in FIG. 7. Magazine side panels 20 maintain package 22 in proper position until moved between slide channels 31 by pusher plate 32. Actuation of cylinder 39 according to a program sequence, such as a microprocessor unit (not shown) located within control panel 15, will cause pusher plate 32 to move toward unload station 38 as shown by arrows A in FIG. 4, whereat loaded and locked package 22 is located beneath knockout assembly 45. Package slide assembly 30 is in a generally horizontal plane which cuts through unload mechanism 42, such that knockout assembly 45 is above slide assembly 30, and unlocking assembly 43 and unlatching assembly 44 are below slide assembly 30. Once pusher plate 32 has moved package 22, as shown in FIG. 3, into unload station 38, it is operated on by unload mechanism 42.

Figure 4:
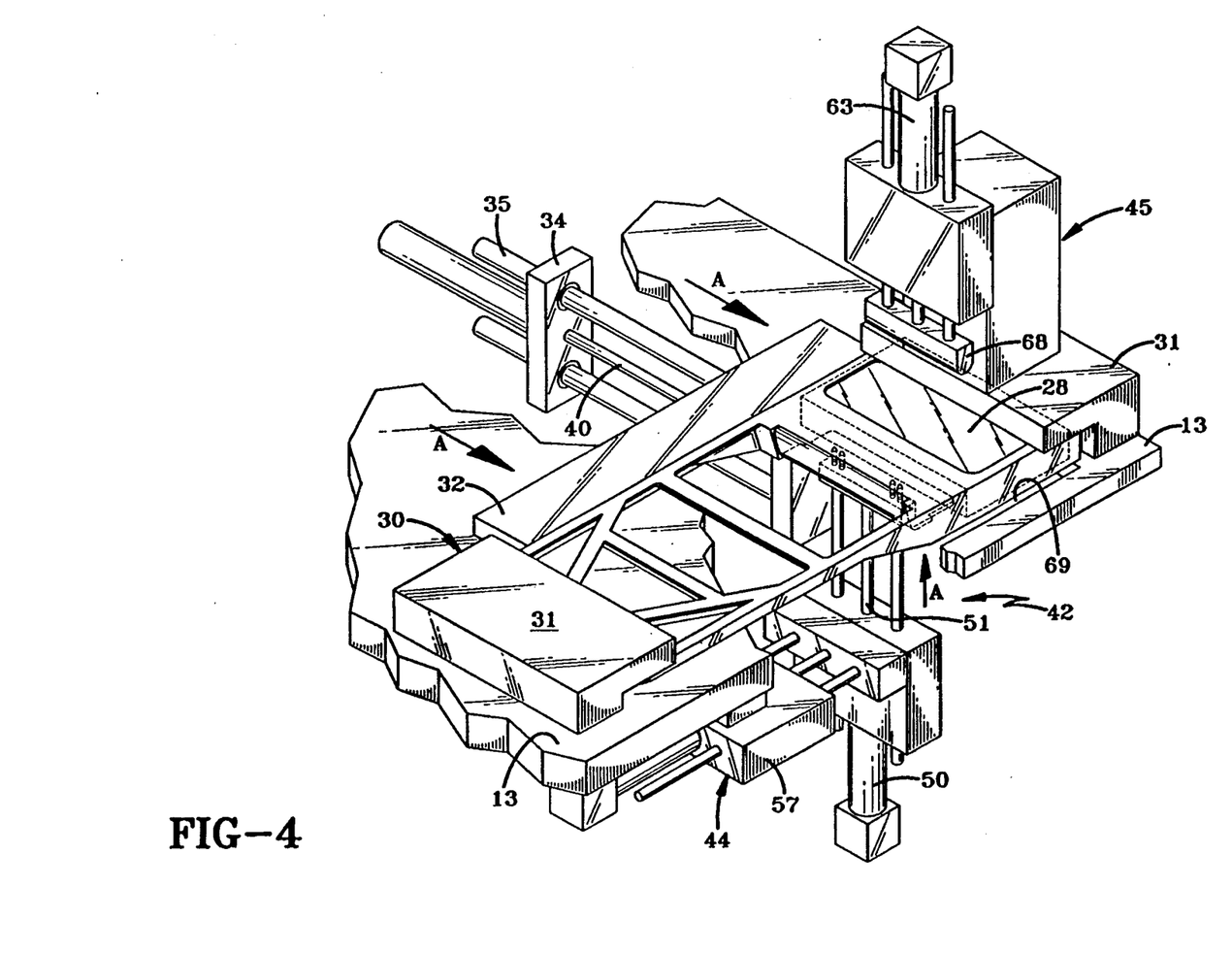
FIG. 4 is a perspective view similar to FIG. 3 showing the engagement of the unlocking pins with the lock plate of the loaded security package.

As shown in FIG. 4, after locked package 22 is positioned at unload station 38, unlock cylinder 50 is actuated according to the programmed sequence. Piston rod 51 will move key plate 47 upwards until access pins 54 enter key entry apertures 27 of security package lock plate 23. Upon entry of pins 54 into apertures 27, the locking mechanism concealed within lock housing 29 is released such that the lock plate 23 may be opened, as described in U.S. Pat. No. 4,384,238. When access pins 54 enter apertures 27, they force pairs of opposing locking tangs apart such that the distance therebetween is greater than the diameter of a locking tab contained within lock housing 29, allowing the tab to travel therebetween, to unlock the security package.

Figure 5:
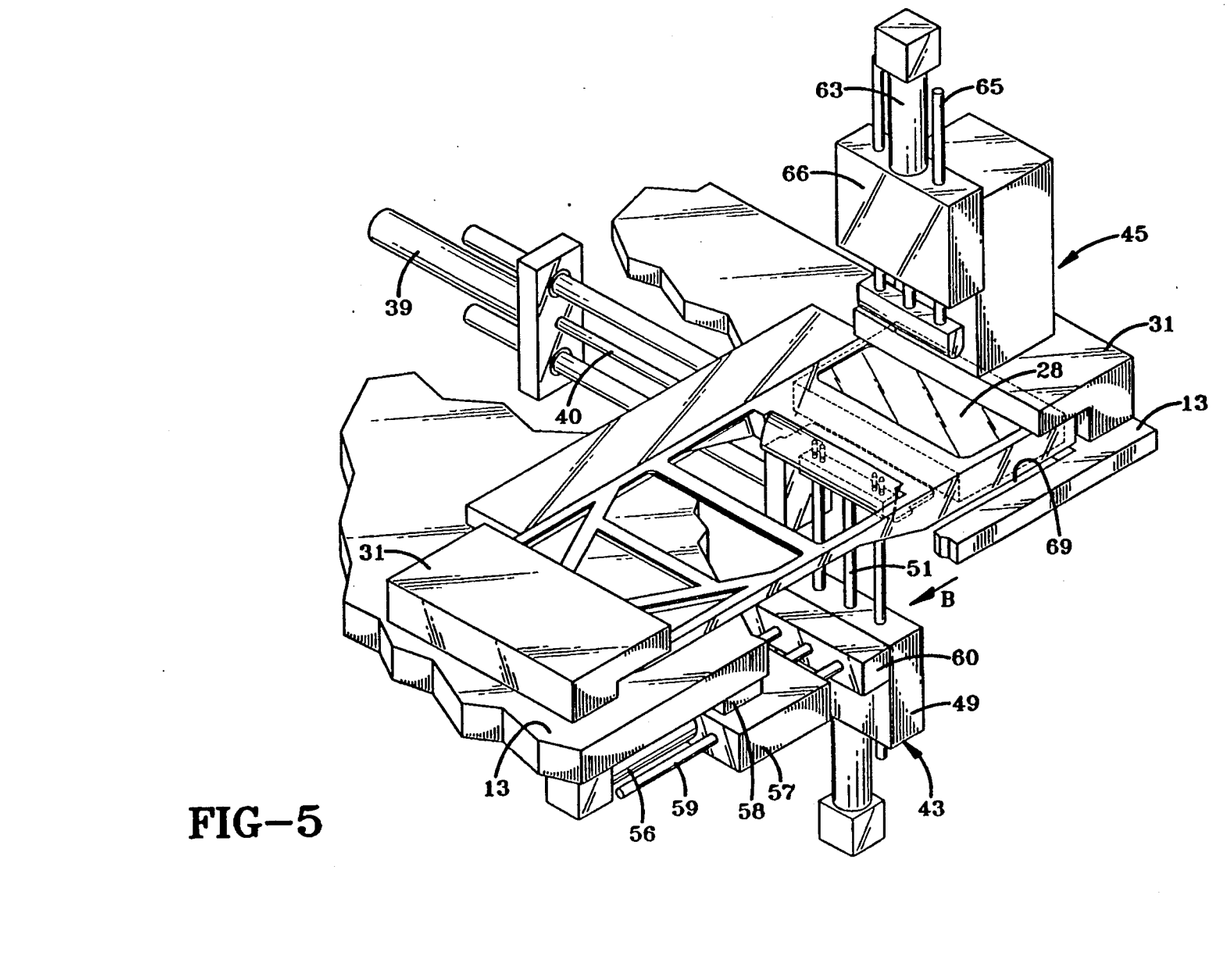
FIG. 5 is a perspective view similar to FIGS. 3 and 4 showing movement of the lock plate from the fully locked position to the unlocked position unblocking the access opening of the storage compartment.

Referring to FIG. 5, after security package 22 has been unlocked, unlatching cylinder 56 is actuated to apply a force to bearing block 49 which pulls the entire unlocking assembly 43 along with key plate 47, in the direction of arrow B. This movement will slide lock plate 23 from its locked position of FIGS. 3 and 4 to its unlocked position of FIG. 5 by the engagement of pins 54 within lock plate apertures 27, in which position plate 23 no longer remains over any portion of access opening 24 of security package 22.

Figure 6:
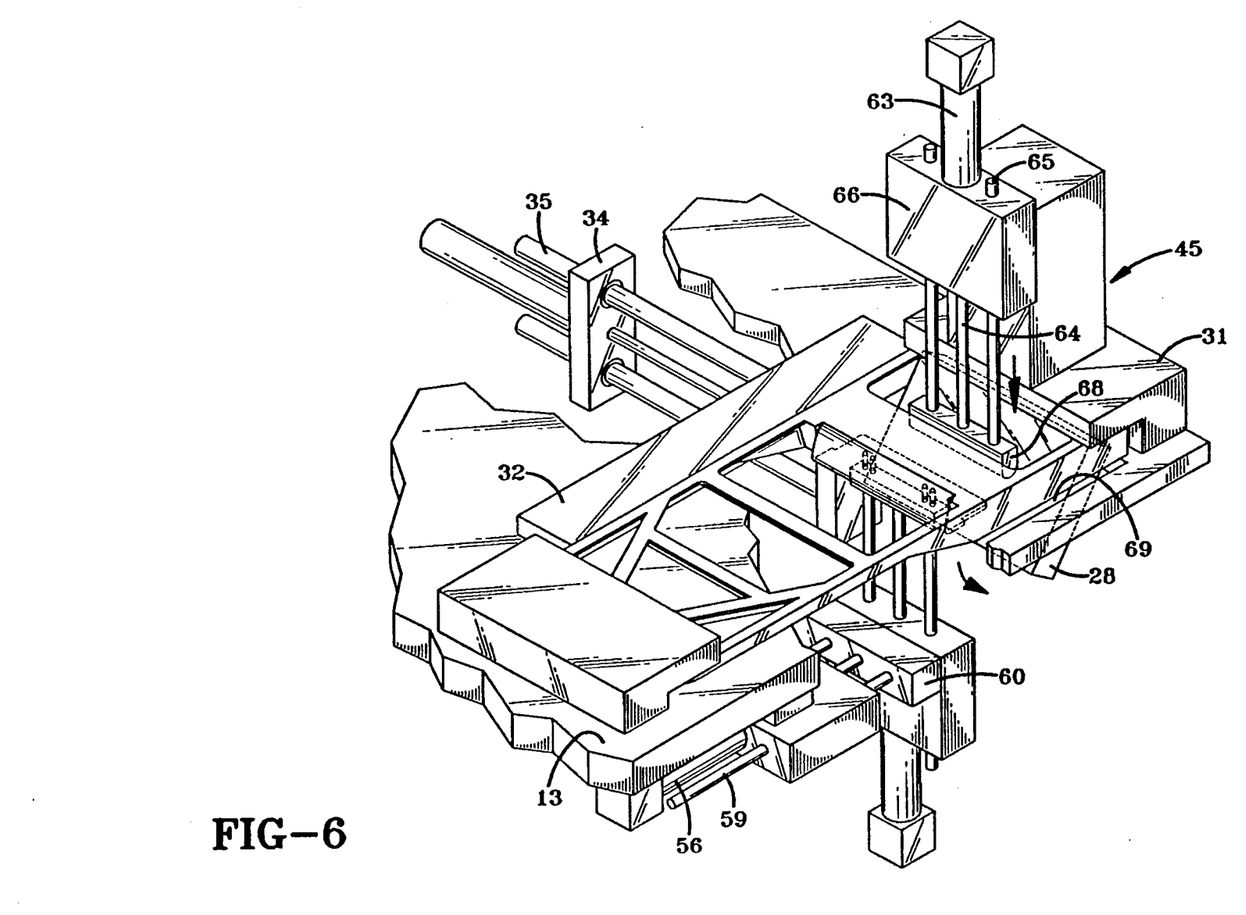
FIG. 6 is a perspective view similar to FIGS. 3-5 showing a power actuated plunger moving an end of the cassette partially out of the storage compartment of the security package at the unload station.

Once cylinder 56 has moved lock plate 23 from the access opening 24, knockout assembly 45 is actuated as shown in FIG. 6. Cylinder 63 is actuated which causes pusher pad 68 at the end of piston rod 64, to apply a downward force to the end of cassette 28 which is located adjacent lock plate 23, forces the cassette end out of the storage compartment and through access opening 24 and through a discharge opening 69 formed in base 13 at the unload station. Continued downward movement of pad 68 will cause the entire cassette to drop out of security package 18 as it is acted on by gravity and the downward force of pad 68, thereby unloading the cassette from the security package 18. Preferably a collection container or conveyor will be located beneath unload station 38 for receiving the cassettes as they are discharged from the security package.

Figure 7:
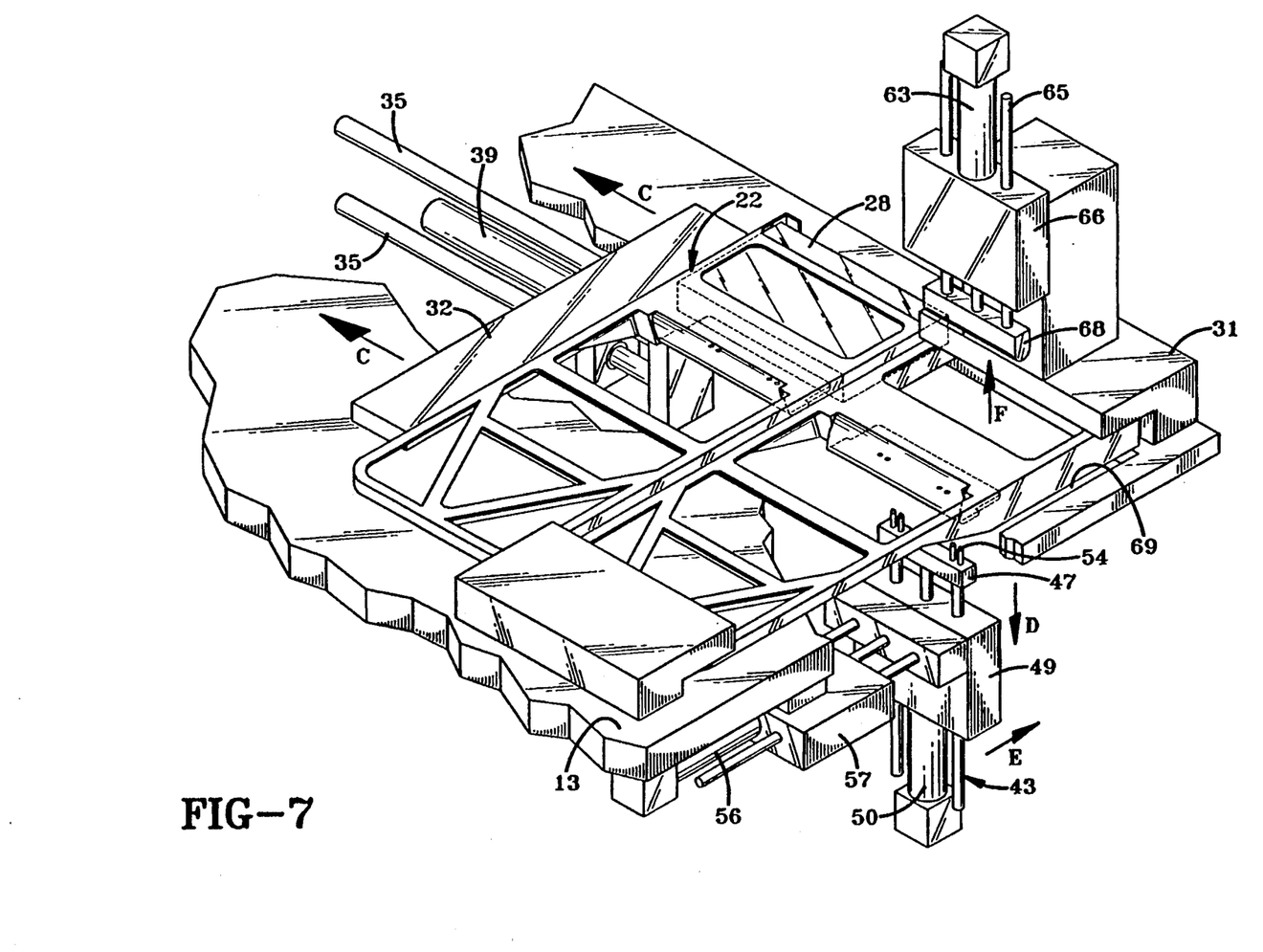
FIG. 7 is a perspective view similar to FIGS. 3-6 showing the simultaneous removal of the just emptied security package from the unload station, and the automatic feeding of a loaded security package to the unload station to be unloaded.
Figure 8:
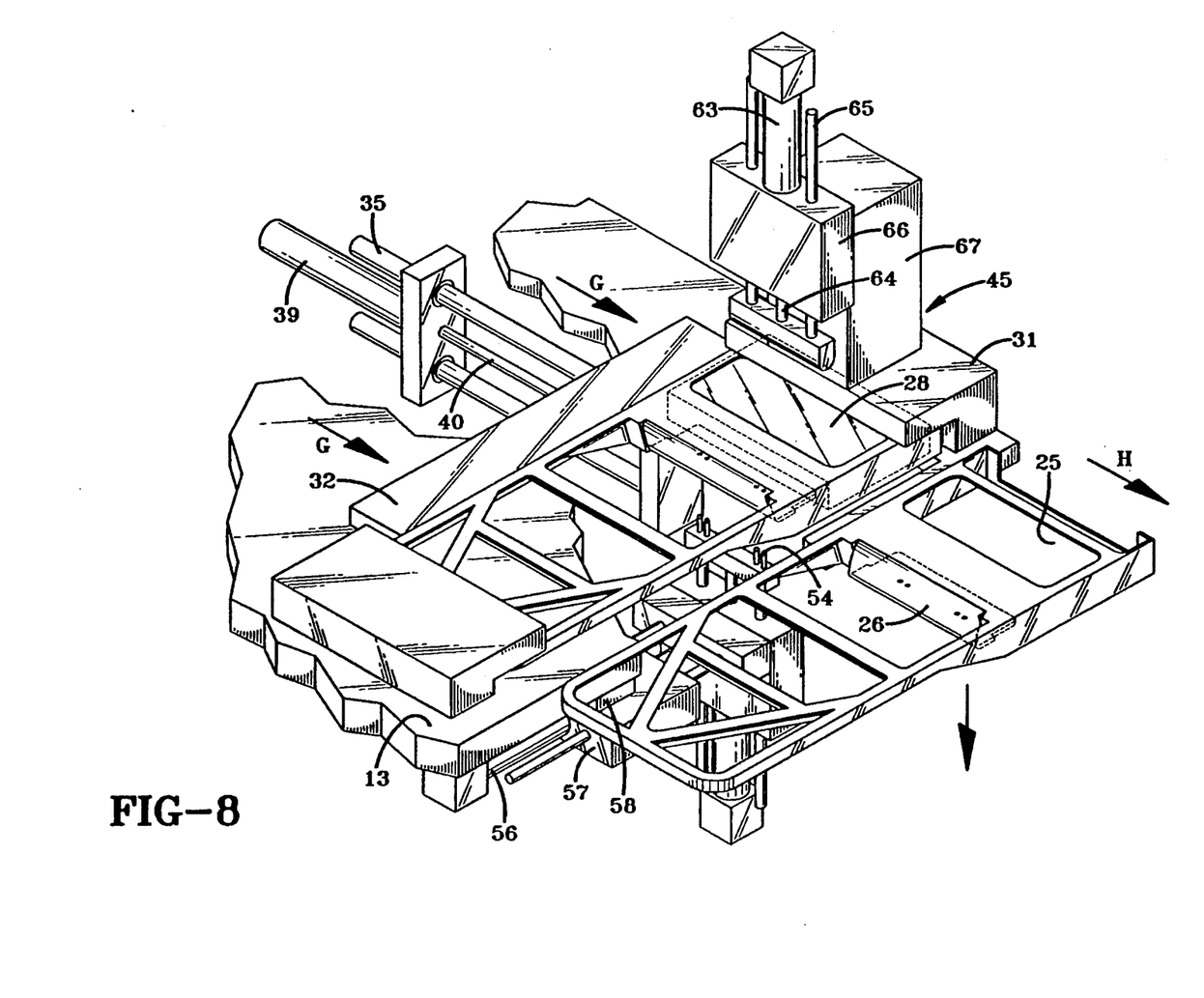
FIG. 8 is a perspective view similar to FIGS. 3-7 showing the just unloaded security package being discharged from the unloading station and the next loaded security package in position for unloading.

Referring next to FIG. 7, there is shown the movement of each sub-assembly after a given security package 22 is unloaded. Specifically, feeder cylinder 39 will be actuated to travel in the direction depicted by arrow C, such that pusher plate 32 is positioned at the distal end of the supply magazine with respect to the unload station 38, at which position a second locked security package 22 will drop into the space created between the pusher bar and the previously unloaded package. In this manner, one side of a loaded security package is generally contiguous with pusher plate 23 and the opposite side is contiguous with the security package at unload station 38. However, before feeder cylinder 39 is actuated to move another loaded security package into the unload station, unlock cylinder 50 is actuated to move key plate 47 and pins 54 out of engagement with the lock plate of the unloaded security package as depicted at arrow D. Unlatch cylinder 56 then is actuated to move key plate 47 horizontally in the direction of arrow E, so that access pins 54 are in substantially vertical alignment with key entry apertures 27 of the next locked and loaded package 22. Lastly, knockout cylinder 63 is actuated to lift pusher pad 68 in a vertical upward direction as shown by arrow F, removing it from its lowered position within slide channels 31.

Upon completion of the above sequence, feeder cylinder 39 is reactuated moving pusher plate 32 in the direction of arrows G (FIG. 8), applying an even pressure along a side of the loaded security package 22, just positioned at slide assembly 30 from magazine 16, causing the previously unloaded security package to move in the direction of arrows H and fall by gravity into any convenient hopper, bin, or onto a conveyor located beneath base 13.

The various pressure actuated cylinders of the present invention preferably are pneumatic but could be powered by various other means if desired, without affecting the concept of the invention. Furthermore, the various slide assemblies may have other constructions in order to move the packages from their storage magazine to the unload station. However, the particular mechanisms shown in the drawings and described above are believed to best achieve the desired objectives and advantages of the present invention. Likewise, the various controls may be a programmable controller or other type of logic system, and various limit switches and detection mechanisms, all of which are well known in the art and therefore are not described herein in further detail, may be utilized to control the operations of these mechanisms. Also, it is readily understood that the term cassette as used throughout may include other types of recorded medium such as videotapes, compact discs, video games, computer discs, etc. without departing from the spirit of the present invention.

Accordingly, the improved machine and method for unlocking a locked security package and unloading the cassette retained therein is simplified, provides an effective, safe, inexpensive, and efficient mechanism which achieves all the enumerated objectives, provides for eliminating difficulties encountered with prior mechanisms, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved machine and method is constructed and used, the characteristics of the construction, and the advantageous, new and useful results obtained; the new and useful structures, devices, elements, arrangements, parts and combinations, are set forth in the appended claims.

We claim:

1. A method of unloading a cassette from a security package of a type having a storage compartment with an access opening in communication with the storage compartment for inserting and removing the cassette into and out of the storage compartment, and a lock plate mounted on the package and movable across at least a portion of said access opening between locked an unlocked positions, and lock means for locking the plate in the locked position to block removal of the cassette from within the storage compartment through the access opening, said method including the steps of:
   a) automatically moving a loaded security package from a supply of said loaded packages to an unload station;
   b) disengaging the lock plate from the lock means within the security package;
   c) moving the lock plate from the locked position to the unlocked position;
   d) applying a generally downward force to the cassette to move a first end of the cassette downwardly through the access opening of said storage compartment and partially out of said storage compartment; and
   e) allowing a second end of said cassette to fall out of said storage compartment to fully remove said cassette from said compartment.

2. The method defined in claim 1 including the steps of inserting pin means in a first direction generally perpendicularly into the lock means through openings in the lock plate to disengage said lock means from the lock plate; and then moving the pin means in a second direction generally orthogonal to the first direction to move the lock plate to the unlocked position.

3. The method defined in claim 2 including the step of removing the pin means from the lock plate openings after the cassette has been removed from the storage compartment; and then moving the pin means to a position beneath the lock plate of another security package at the unload station for subsequent movement in the first direction.

4. The method defined in claim 1 wherein the step of automatically moving the loaded security package from the supply of said loaded packages to the unload station includes discharging a loaded security package from a bottom of a vertical stack of said packages; and then pushing the discharged package by pressure actuated cylinder means horizontally along a slide channel when moving the package to the unload station.

5. The method defined in claim 4 including the steps of placing the storage compartment of the security package over a discharge opening at the unload station; and moving a pressure actuated plunged vertically downwardly into contact with the cassette after the lock plate has been moved to the unlocked position to apply the force to the cassette to move the first end of the cassette through the access opening.

6. The method defined in claim 1 including the step of depositing a second loaded security package from the supply of said packages in horizontal alignment with the first security package when said first package is at the unload station; and then moving the second security package toward the load station and into contact with the first security package to remove said first security package from the unload station after the cassette has been removed therefrom.

* * * * *